(12) United States Patent
Robeen et al.

(10) Patent No.: US 10,776,787 B2
(45) Date of Patent: Sep. 15, 2020

(54) SYSTEMS AND METHODS FOR PROVIDING NOTIFICATION SERVICES USING A DIGITAL WALLET PLATFORM

(71) Applicant: MasterCard International Incorporated, Purchase, NY (US)

(72) Inventors: Erica Joann Robeen, Hardin, IL (US); Linda M. Mautz, O'Fallon, MO (US); Richard Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 618 days.

(21) Appl. No.: 15/257,863

(22) Filed: Sep. 6, 2016

(65) Prior Publication Data
US 2018/0068314 A1    Mar. 8, 2018

(51) Int. Cl.
G06Q 20/40 (2012.01)
G06Q 20/32 (2012.01)
G06Q 20/36 (2012.01)
G06Q 20/34 (2012.01)

(52) U.S. Cl.
CPC ......... *G06Q 20/4016* (2013.01); *G06Q 20/32* (2013.01); *G06Q 20/354* (2013.01); *G06Q 20/3572* (2013.01); *G06Q 20/36* (2013.01); *G06Q 20/367* (2013.01); *G06Q 20/3674* (2013.01); *G06Q 20/4014* (2013.01)

(58) Field of Classification Search
None
See application file for complete search history.

(56) References Cited

U.S. PATENT DOCUMENTS

| 6,064,990 A * | 5/2000 | Goldsmith | G06Q 20/04 235/379 |
| 6,609,113 B1 * | 8/2003 | O'Leary | G06Q 20/04 705/39 |
| 8,442,914 B2 * | 5/2013 | Killian | G06Q 20/105 705/41 |

(Continued)

OTHER PUBLICATIONS

Rachkov, Vassil, "International Search Report", International Patent Application No. PCT/US17/045883, dated Oct. 17, 2017, 5 pages.

(Continued)

*Primary Examiner* — Christopher Bridges

(57) ABSTRACT

Embodiments of the disclosure enable a system to provide notification services. The system receives account selection data associated with one or more cardholder accounts, identifies contact data corresponding to one or more issuer devices associated with the one or more cardholder accounts, generates notification data associated with the one or more cardholder accounts for notifying one or more issuers associated with the one or more cardholder accounts, receives transaction data associated with one or more financial transactions, and analyzes the received transaction data to generate wallet data corresponding to the transaction data for providing an opportunity to manage the one or more financial transactions.ABstracts of the disclosure provide for transmitting notification data in an efficient and user-friendly manner.

20 Claims, 7 Drawing Sheets

(56) References Cited

U.S. PATENT DOCUMENTS

| | | | |
|---|---|---|---|
| 8,447,666 B1* | 5/2013 | Keld | G06Q 10/087 |
| | | | 705/16 |
| 2002/0161701 A1* | 10/2002 | Warmack | G06Q 20/023 |
| | | | 705/39 |
| 2003/0217001 A1* | 11/2003 | McQuaide, Jr. | G06Q 20/10 |
| | | | 705/41 |
| 2004/0209596 A1* | 10/2004 | Wong | G06Q 20/02 |
| | | | 455/405 |
| 2007/0226086 A1 | 9/2007 | Bauman et al. | |
| 2008/0228602 A1 | 9/2008 | Bauman et al. | |
| 2008/0288405 A1* | 11/2008 | John | G06Q 20/40 |
| | | | 705/44 |
| 2011/0302084 A1 | 12/2011 | Melik-Aslanian et al. | |
| 2011/0307382 A1* | 12/2011 | Siegel | G06Q 20/4016 |
| | | | 705/44 |
| 2012/0203698 A1* | 8/2012 | Duncan | G06Q 20/34 |
| | | | 705/44 |
| 2014/0244461 A1 | 8/2014 | Shenoy et al. | |
| 2015/0095240 A1 | 4/2015 | Specogna et al. | |
| 2015/0120472 A1* | 4/2015 | Aabye | G06Q 20/40 |
| | | | 705/16 |
| 2015/0134512 A1* | 5/2015 | Mueller | G06Q 20/4016 |
| | | | 705/39 |
| 2015/0254642 A1 | 9/2015 | Bondesen et al. | |

OTHER PUBLICATIONS

Rachkov, Vassil, "Written Opinion", International Patent Application No. PCT/US17/045883, dated Oct. 17, 2017, 7 pages.

\* cited by examiner

SYSTEMS AND METHODS FOR PROVIDING NOTIFICATION SERVICES USING A DIGITAL WALLET PLATFORM

FIELD OF THE DISCLOSURE

The subject matter described herein relates generally to digital wallet technologies and, more specifically, to systems and methods for providing notification services using a digital wallet platform.

BACKGROUND

Financial transaction cards have made great gains as a means to attract financial accounts to financial institutions and, in the case of credit cards, as a medium to create small loans and generate interest income for financial institutions. However, fraudulent financial transactions involving credit cards and other similar payment mechanisms may result in huge losses for cardholders, merchants, banks, and other financial institutions. To mitigate such fraudulent financial transactions, a cardholder may notify an issuer of the credit card upon identifying that the credit card is lost or stolen.

However, using known methods and systems to notify an issuer of a lost or stolen credit card may be difficult, time-consuming, and/or onerous. For example, when a cardholder does not have access to a physical credit card, the cardholder may turn to sources other than the physical credit card itself, such as a website, to obtain contact information for notifying the issuer of a lost or stolen credit card. In addition to the time and energy consumed to obtain the contact information from an unfamiliar source, the cardholder may spend additional time and/or energy to ensure that the contact information and/or its source is legitimate and not part of a "phishing" scheme. Additionally, at least some known notification methods and systems may involve a lengthy interchange that enables the issuer to ensure that the notifier is, in fact, an authorized cardholder and to collect information regarding the lost or stolen credit card. The difficult, time-consuming, and/or onerous nature of at least some known notification methods and systems may be intensified when a physical wallet including a plurality of physical credit cards is lost or stolen and the cardholder desires to notify each issuer of the loss or theft of a respective physical credit card.

SUMMARY

Embodiments of the disclosure enable a system to provide notification services. The system includes a memory device storing data associated with one or more digital wallets and computer-executable instructions, and a processor. The processor executes the computer-executable instructions to receive account selection data associated with one or more cardholder accounts, identify contact data corresponding to one or more issuer devices associated with the one or more cardholder accounts, generate notification data associated with the one or more cardholder accounts for notifying one or more issuers associated with the one or more cardholder accounts, receive transaction data associated with one or more financial transactions, and analyze the received transaction data to generate wallet data corresponding to the transaction data for providing an opportunity to manage the one or more financial transactions.

In another aspect, one or more computer storage media embodied with computer-executable instructions are provided. The one or more computer storage media include a notification component and a resolution component. Upon execution by at least one processor, the notification component causes a computing system to receive account selection data associated with one or more cardholder accounts, identify contact data corresponding to one or more issuer devices associated with the one or more cardholder accounts, generate notification data associated with the one or more cardholder accounts, and transmit the notification data to the one or more issuer devices for notifying one or more issuers associated with the one or more cardholder accounts. Upon execution by the at least one processor, the resolution component causes the computing system to receive transaction data associated with one or more financial transactions, generate wallet data corresponding to the transaction data, and transmit the wallet data to a client device associated with a digital wallet for providing an opportunity to manage the one or more financial transactions.

In yet another aspect, a computer-implemented method is provided for providing notification services. The computer-implemented method includes receiving account selection data associated with one or more user accounts, identifying contact data corresponding to one or more account systems associated with the one or more user accounts, generating notification data associated with the one or more user accounts, transmitting the generated notification data to notify one or more administrators associated with the one or more user accounts, receiving transaction data associated with one or more transactions, generating wallet data corresponding to the transaction data, and transmitting the generated wallet data to provide an opportunity to manage the one or more transactions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
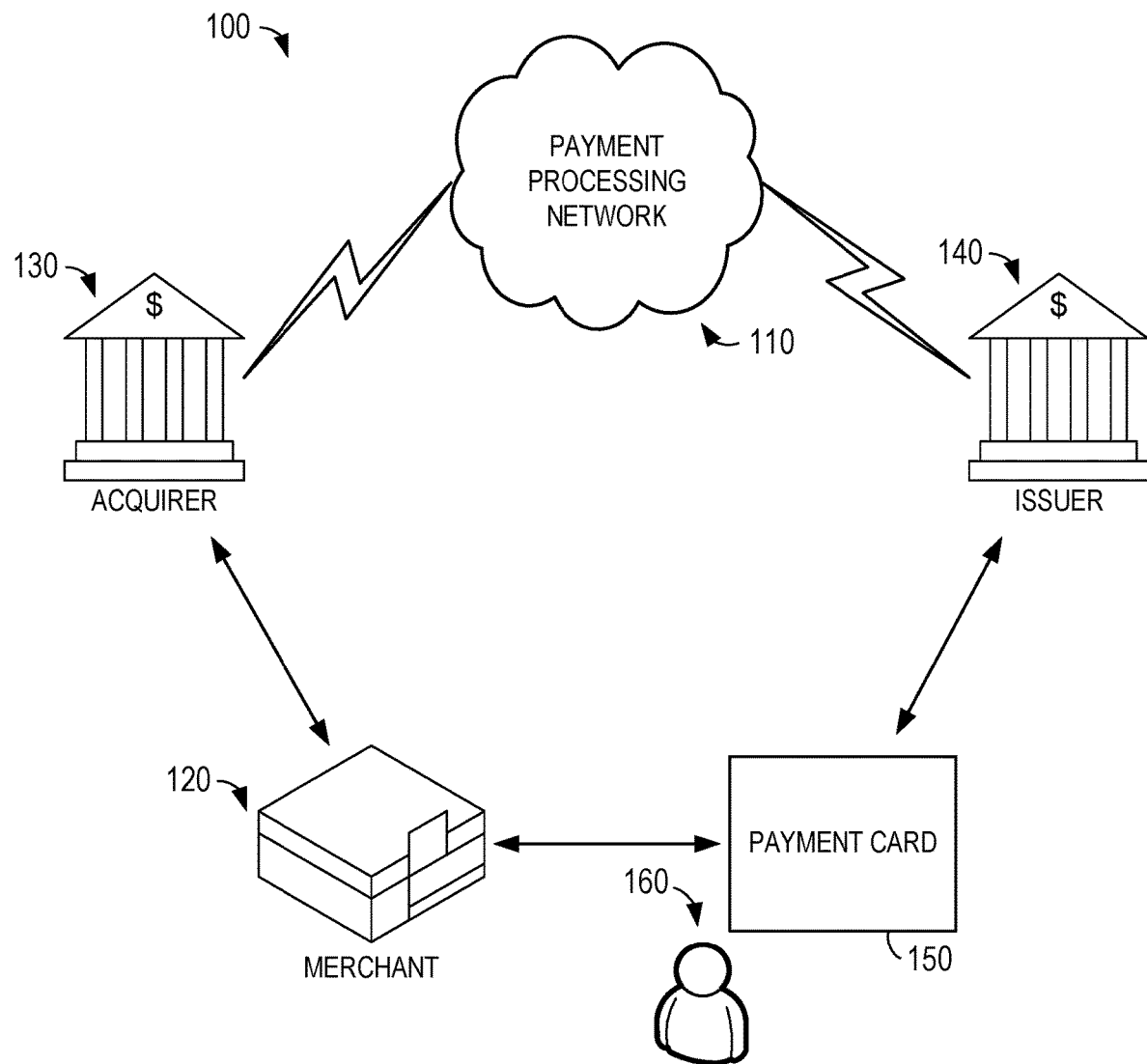
FIG. 1 is a block diagram illustrating an example environment for processing financial transactions.

The subject matter described herein relates to a digital wallet platform that may be used to provide notification services. Embodiments of the disclosure enable one or more issuers of one or more payment cards to be contacted (e.g., regarding a lost or stolen payment card) in a secure and user-friendly manner. For example, the digital wallet platform associated with one or more payment cards may allow a cardholder to communicate with one or more issuers of the one or more payment cards using the digital wallet platform. The embodiments described herein are adapted to configure a digital wallet platform to perform a plurality of functions including payment card management.

Aspects of the disclosure provide for a computing system that processes one or more transactions in an environment including a plurality of devices coupled to each other via a network (e.g., a local area network (LAN), a wide area network (WAN), the Internet). For example, a digital wallet platform may be used to facilitate communication between a plurality of other computing systems (e.g., a client device and an account system) by transmitting or receiving selection data, notification data, transaction data, wallet data, verification data, confirmation data, and/or any other data via the digital wallet platform. In this manner, a plurality of user accounts may be accessible and a plurality of entities associated with the user accounts may be contacted via a digital wallet platform.

The systems and processes described herein may be implemented using computer programming or engineering techniques including computer software, firmware, hardware or a combination or subset thereof. At least one technical problem with known systems is that it can be difficult, time-consuming, and/or onerous to identify and notify a plurality of entities of an incident (e.g., the loss or theft of a plurality of payment cards) with a notification tailored to each entity. The embodiments described herein address at least this technical problem.

By providing notification services in the manner described in this disclosure, some embodiments improve user experience, user efficiency, and/or user interaction performance by having a digital wallet platform that allows a plurality of user accounts to be used for notifying a plurality of entities associated with the user accounts. Additionally, some embodiments improve data integrity, data transmission security, and/or communication between systems by using a central computing system (e.g., a digital wallet platform) to control communications between a client device and a plurality of account systems. In this manner, the embodiments described herein may facilitate increasing a functionality of a digital wallet, an integrity of the digital wallet by providing an integrated user interface with increased and/or improved capabilities.

Additionally, some embodiments may reduce processor load by reducing an amount of data to be analyzed or processed, reduce network bandwidth usage by reducing an amount of data to be transmitted, improve processor security by managing access to various accounts, and/or reduce error rate by automating the analysis and processing of transactions and simplifying the notification process. In some embodiments, the subject matter described herein may facilitate increasing processor speed and/or improving operating system resource allocation.

The technical effect of the systems and processes described herein is achieved by performing at least one of the following operations: a) receive user credential data associated with a user of a client device; b) analyze the user credential data to generate authentication data that identifies an authentication state of the user; c) transmit the authentication data for authenticating the user; d) receive account selection data associated with one or more cardholder accounts; e) identify contact data corresponding to one or more issuer devices associated with the one or more cardholder accounts; f) determine whether a predetermined contact data threshold associated with the one or more issuer devices is satisfied; g) transmit a request to provide contact data; h) receive a response to the request including the contact data; i) generate notification data associated with the one or more cardholder accounts; j) transmit the notification data to the one or more issuer devices; k) receive transaction data associated with one or more financial transactions; l) analyze transaction data to generate wallet data corresponding to the transaction data; m) transmit the wallet data; n) receive transaction selection data associated with a first financial transaction; o) generate verification data corresponding to the transaction selection data; p) transmit the verification data; q) determine whether a predetermined threshold associated with the verification data is satisfied; and/or r) transmit a request to provide confirmation data.

FIG. 1 is a block diagram illustrating an example environment 100 for processing one or more financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data 430 between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the processing network 110.

A cardholder 160 uses a payment product, such as a payment card 150, to purchase a good or service from a merchant 120. In some embodiments, the payment card 150 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 150 to purchase a good or service from a merchant 120. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 160 may use any payment product that is linked or associated with a corresponding cardholder account maintained by an issuer 140. As described herein, the term "payment card"

includes credit cards, debit cards, prepaid cards, digital cards, smart cards, and any other payment product that is linked or associated with a corresponding cardholder account maintained by an issuer 140. Payment cards 150 may have any shape, size, or configuration that enables the environment 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions including e-commerce transactions, card-not-present transactions, or card-on-file transactions). Account information may include a name of the cardholder 160, an account number, an expiration date, and/or a security code (such as a card verification value (CVV), a card verification code (CVC), and the like).

The merchant 120 requests authorization from an acquirer 130 for at least the amount of the purchase. The merchant 120 may request authorization using any financial transaction computing device configured to transmit the account information of the cardholder 160 to one or more financial transaction processing computing devices of the acquirer 130. For example, the merchant 120 may request authorization through a point-of-sale (POS) terminal, which reads account information from a microchip or magnetic stripe on the payment card 150, and transmits the account information to the one or more financial transaction processing computing devices of the acquirer 130. For another example, the POS terminal reads account information from a device configured to communicate with the POS terminal using contactless payment technology, and transmits the account information to one or more financial transaction processing computing devices of the acquirer 130.

Using the processing network 110, the financial transaction processing computing devices of the acquirer 130 communicate with one or more financial transaction processing computing devices of an issuer 140 to determine whether the account information matches or corresponds to the account information of the issuer 140, whether the cardholder account is in good standing, and/or whether the purchase is covered by (e.g., less than) a credit line or account balance associated with the cardholder account. Based on these determinations, the financial transaction processing computing devices of the issuer 140 determine whether to approve or decline the request for authorization from the merchant 120.

If the request for authorization is declined, the merchant 120 is notified as such, and may request authorization from the acquirer 130 for a lesser amount or request an alternative form of payment from the cardholder 160. If the request for authorization is approved, an authorization code is issued to the merchant 120, and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer 130 for reimbursing the merchant 120. When a credit card is used, the issuer 140 may bill the cardholder 160 to settle the cardholder account (e.g., a credit card account). When a debit or prepaid card is used, the issuer 140 may automatically withdraw funds from the cardholder account (e.g., a checking account, a savings account).

Figure 2:
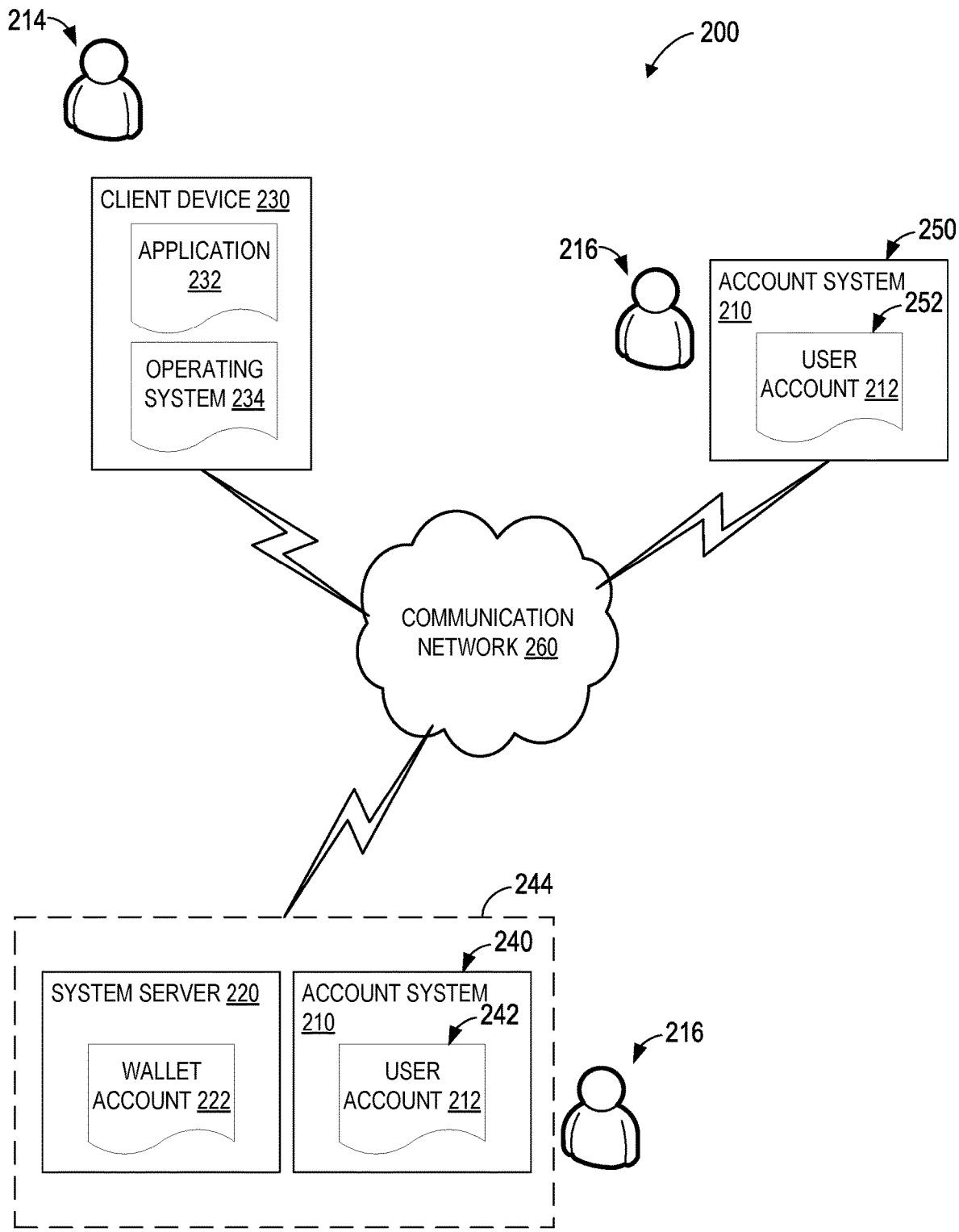
FIG. 2 is a block diagram illustrating an example ecosystem for providing notification services using a digital wallet platform in an environment, such as the environment shown in FIG. 1.

FIG. 2 is a block diagram illustrating an example ecosystem 200 for providing notification services using a digital wallet platform in the environment 100. The ecosystem 200 includes one or more account systems 210 that store and maintain one or more user accounts 212 associated with one or more users 214 (e.g., cardholder 160). User accounts 212 may include, for example, a financial account, a cardholder account, a checking account, a savings account, a brokerage account, a merchant loyalty account, an insurance account, a membership account, a resident account, an employee account, and the like.

A user account 212 may be used to perform one or more account-related functions. For example, a physical article associated with the user account 212 may allow its possessor to perform one or more account-related functions using the user account 212. Physical articles may include, for example, a credit card, a debit card, a prepaid card, a bank card, a gift card, an identification card, a membership card, a ticket or pass, an access card, an insurance card, a merchant loyalty card, and the like.

In some embodiments, an account system 210 is associated with a respective user or administrator 216 that administers and monitors the user accounts 212. The administrator 216 may, for example, open a user account 212 and issue or provide one or more physical articles associated with the user account 212 to the user 214. Administrators 216 may include, for example, a retailer, a service provider, a financial institution, an insurance company, a club, an organization, a property manager, an employer, a government entity, and the like.

The ecosystem 200 includes a digital wallet platform or system server 220 that stores and maintains one or more wallet accounts 222 associated with one or more users 214. The wallet accounts 212 may be used to manage or use one or more user accounts 212. For example, a wallet account 222 may include registered data that enables the system server 220 to authenticate and authorize the user 214 to manage or use the user accounts 212.

Registered data may include credential data and/or contact data. Credential data includes any data that enables any entity to be identified and/or authenticated, such as an identifier, an account number, a public key infrastructure (PKI) certificate, a password, a personal identification number (PIN), a token, and/or biometric data. Contact data includes any data that enables any entity to be located and/or approached for communicating with the entity, such as an identifier, a routing number, a media access controller (MAC) address, an Internet Protocol (IP) address, an email address, and/or a telephone number. The registered data may be obtained and/or registered, for example, during a registration phase.

The user 214 may utilize a client device 230, for example, to communicate with the system server 220 to use a wallet account 212 associated with the user 214. In some embodiments, the client device 230 includes an application 232 ("app") configured to communicatively couple the client device 230 to one or more account systems 210 and/or the system server 220 such that data may be transmitted between the client device 230 and the account systems 210 and/or system server 220. In this manner, the application 232 may be used to access one or more account systems 210 and/or the system server 220 for managing or using one or more user accounts 212. For example, the application 232 may be used to enter into one or more financial transactions using a cardholder account. In some embodiments, the application 232 allows the user 214 to systematically and substantially simultaneously notify one or more administrators 216. For example, the application 232 may be used to report one or more lost or stolen physical articles.

In some embodiments, the client device 230 includes an operating system 234 that enables the user 214 to use the application 232 in a user-friendly manner. For example, the operating system 234 may include one or more application program interfaces (APIs) that enable the client device 230 to present information to and/or obtain user input from one or more users of the client device 230, such as the user 214 (e.g., via a graphical user interface) and/or to transmit data to and/or receive data from one or more computing systems, such as an account system 210 or the system server 220 (e.g., via a network interface).

The system server 220 is configured to facilitate and control at least some communication (e.g., data transmission) in the ecosystem 200. For example, registered data may be used to establish one or more secure sessions among or between the account system 210, system server 220, and/or client device 230. In some embodiments, one or more account systems 210, such as a first issuer system 240 that stores and maintains one or more first cardholder accounts 242, are in a first zone 244 associated with a first set of permission levels that facilitates increased communication with the system server 220. For example, the first issuer system 240 and the system server 220 may be associated with a common entity. Additionally or alternatively, one or more account systems 210 may not be in the first zone 244. For example, a second issuer system 250 that stores and maintains one or more second cardholder accounts 252 may be in a second zone associated with a second set of permission levels that are less permissive with respect to communicating with the system server 220 than the first set of permission levels.

The ecosystem 200 includes one or more communication networks 260 that enable data to be transferred between a plurality of computing systems (e.g., account system 210, system server 220, client device 230, first issuer system 240, second issuer system 250) coupled to the communication network 260. Example communication networks 260 include a cellular or mobile network and the Internet. Alternatively, the communication network 260 may be any communication medium that enables the ecosystem 200 to function as described herein including, for example, a personal area network (PAN), a LAN, and/or a WAN.

Figure 3:
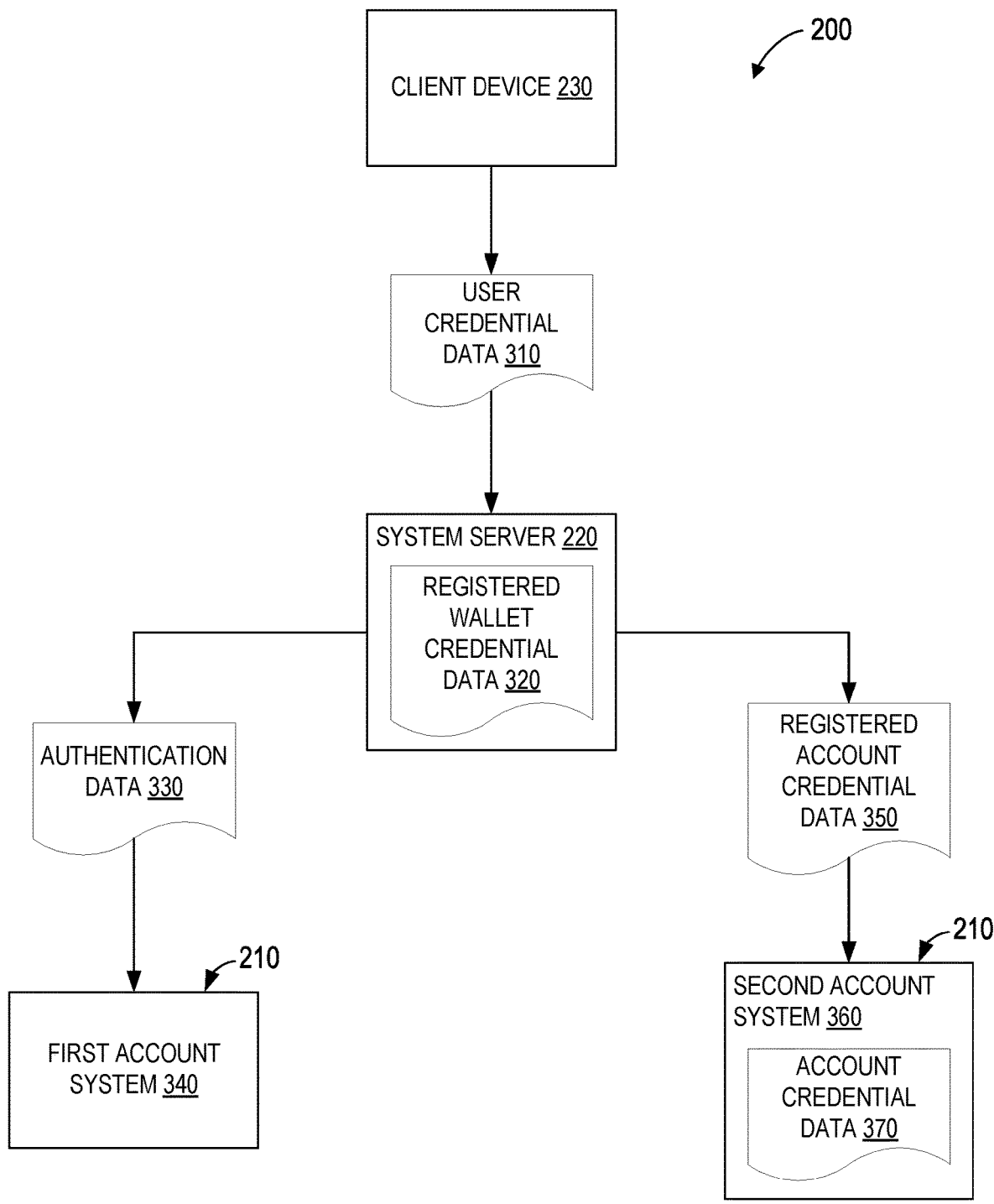
FIG. 3 is a block diagram illustrating an example authentication stage of an ecosystem, such as the ecosystem shown in FIG. 2.

FIG. 3 is a block diagram illustrating an authentication stage of the ecosystem 200 that enables a user 214 to manage or use one or more user accounts 212 using the system server 220. In some embodiments, a client device 230 prompts the user 214 to provide user input for authenticating the user 214 for the system server 220. The prompt may request that the user provide, for example, a wallet identifier (e.g., user input that enables the system server 220 to authenticate the user 214) and/or a wallet password (e.g., user input that enables the system server 220 to authorize the user 214). Upon receiving the user input, the client device 230 may generate user credential data 310 based on the user input, and transmit the user credential data 310 to the system server 220.

The system server 220 is configured to compare the user credential data 310 with registered wallet credential data 320 to determine whether the user 214 is associated with a wallet account 222. If the user credential data 310 corresponds to the registered wallet credential data 320, the system server 220 identifies the user 214 as being authorized to use the wallet account 222 and selectively allows access to the system server 220. On the other hand, if the user credential data 310 does not correspond to the registered wallet credential data 320, the system server 220 identifies the user 214 as being not authorized to use the wallet account 222 and selectively restricts access to the system server 220.

In some embodiments, the system server 220 is configured to provide single sign-on authentication services. In this manner, the user 214 may be allowed to access one or more account systems 210 without providing user input for each account system 210. In some embodiments, the system server 220 generates authentication data 330 that indicates an authentication state associated with the user 214, and transmits the authentication data 330 to one or more account systems 210 for accessing the account systems 210. Additionally or alternatively, the authentication data 330 may be transmitted to the client device 230 for authenticating the user 214 for the account systems 210 without providing user input (e.g., an account identifier, an account password) for each account system 210.

The authentication data 330 indicates whether the user 214 is authenticated and/or authorized and, in some embodiments, is associated with one or more parameters that define a secure session. For example, the authentication data 330 may allow the user 214 to use the wallet account 222 for performing one or more predetermined operations, at one or more predetermined account systems 210, and/or for a predetermined amount of time. Upon receiving the authentication data 330, a first account system 340, for example, may use the authentication data 330 to identify the user 214 as being authorized to use the first account system 340 and selectively allow access to the first account system 340.

Additionally or alternatively, the system server 220 may transmit registered account credential data 350 to one or more account systems 210 for accessing the account systems 210. Upon receiving the registered account credential data 350, a second account system 360, for example, may compare the registered account credential data 350 with account credential data 370 to determine whether the user 214 is associated with a user account 212 stored and maintained at the second account system 360. If the registered account credential data 350 corresponds to the account credential data 370, the account system 210 identifies the user 214 as being authorized to use the user account 212 and selectively allows access to the account system 210. On the other hand, if the registered account credential data 350 does not correspond to the account credential data 370, the account system 210 identifies the user 214 as being not authorized to use the user account 212 and selectively restricts access to the account system 210.

Figure 4:
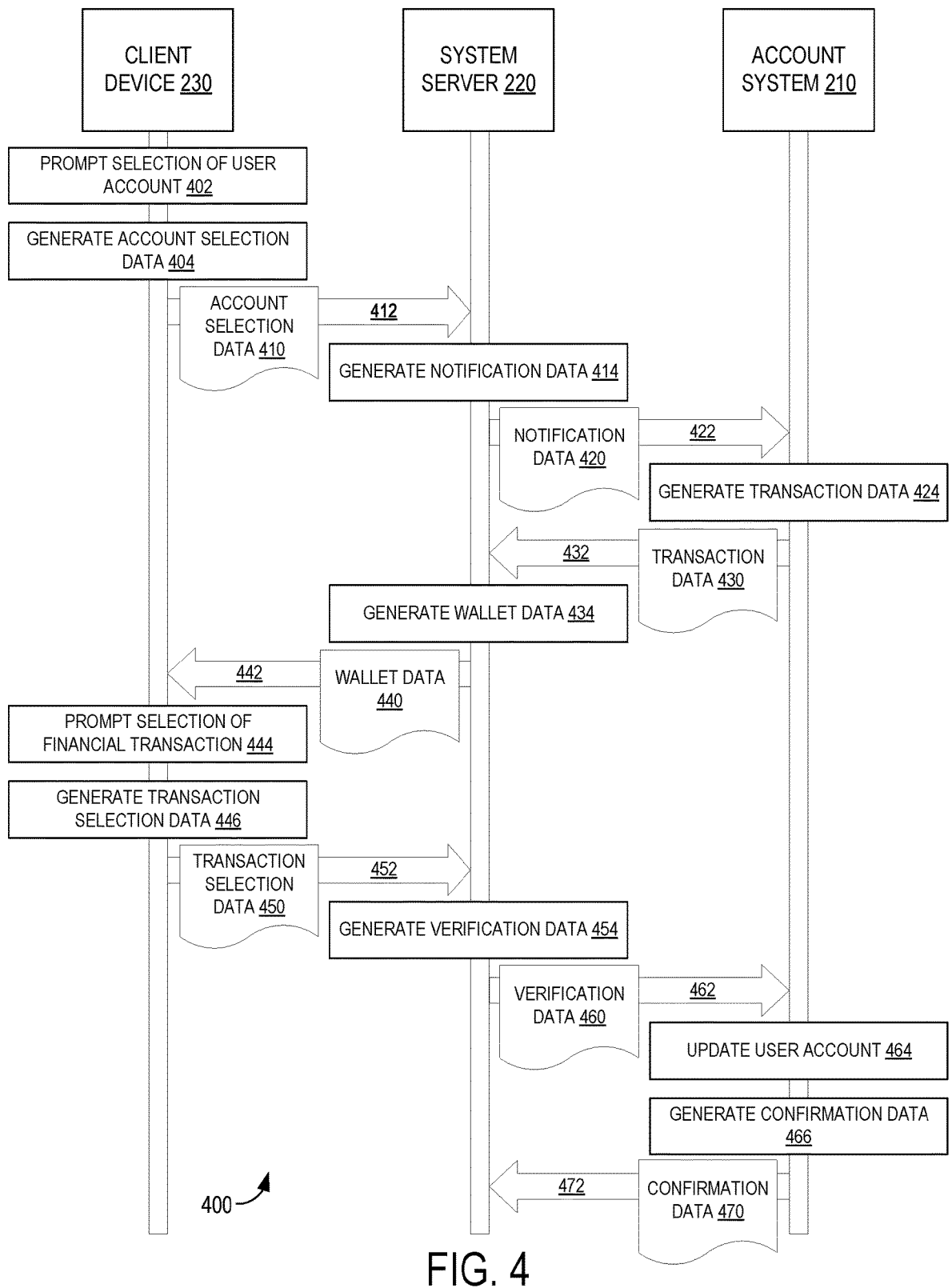
FIG. 4 is a sequence diagram illustrating an example notification stage of an ecosystem, such as the ecosystem shown in FIG. 2.

FIG. 4 is a sequence diagram illustrating an example notification stage 400 of the ecosystem 200. The client device 230 presents information associated with one or more user accounts 212, and prompts at 402 the user 214 to select, from the user accounts 212, at least one user account 212. For example, the user 214 may be prompted to select at least one user account 212 associated with one or more lost or stolen physical articles.

The information may be presented in any arrangement (e.g., list, array) based on one or more criteria including, for example, an account type, an administrator name, an account identifier, a frequency of use, a date of last use, an account balance, a due date, an amount of time since registering the user account 212, and/or an amount of time since opening the user account 212. Additionally or alternatively, the information may be presented with a predetermined selection of zero or more user accounts 212.

Upon identifying a selection of a user account 212, the client device 230 generates at 404 account selection data 410 associated with the selected user account 212. In some embodiments, the client device 230 generates the account selection data 410 to include or be associated with a timestamp that indicates a time associated with the account selection data 410, such as a generation time, a transmission time, and the like. The client device 230 transmits at 412 the account selection data 410 to the system server 220.

Upon receiving the account selection data 410, the system server 220 analyzes the account selection data 410 and, based on the account selection data 410, generates at 414 notification data 420 associated with the selected user account 212. Notification data 420 may include any data that enables a user account 212 and/or a status of the user account 212 to be reported and identified, such as an identifier, an account number, a purpose of notification, an action request, a time of loss or theft, a time associated with the account selection data 410, and the like.

In some embodiments, the system server 220 generates the notification data 420 to include, for each selected user account 212, respective notification data tailored to the selected user account 212. For example, the notification data 420 may include first notification data associated with a first cardholder account for notifying a first issuer that the first cardholder account is potentially compromised or compromised. For another example, the notification data 420 may include bulletin notification data associated with one or more user accounts 212 for notifying one or more merchants 120 (e.g., via a warning bulletin) that the user accounts 212 are potentially compromised or compromised such that a physical article associated with the selected user account 212 may be seized and destroyed upon presentation of the physical article to a merchant 120.

Based on the account selection data 410, the system server 220 identifies contact data corresponding to at least one account system 210 associated with the selected user account 212, and uses the contact data to transmit at 422 the notification data 420 to the account system 210 for notifying at least one administrator 216 associated with the user account 212. For example, the notification data 420 may be transmitted to notify the administrator 216 that the selected user account 212 is at least potentially compromised or compromised.

Additionally or alternatively, the notification data 420 may be transmitted to one or more computing systems that enable one or more entities to notify one or more other entities. For example, the notification data 420 may be transmitted to a bulletin system to notify (e.g., via a warning bulletin) one or more merchants 120 that the selected user account 212 is at least potentially compromised or compromised. For another example, the notification data 420 may be transmitted to a processing network 110 and/or a mobile payment system, such as the APPLE PAY® brand mobile payment system, to enable the processing network 110 and/or the mobile payment system to notify its issuers 140. (APPLE PAY® is a registered trademark of Apple Inc. located in Cupertino, Calif.).

Upon receiving the notification data 420, the account system 210 analyzes the notification data 420 and, based on the notification data 420, identifies the selected user account 212. In some embodiments, the account system 210 identifies one or more transactions associated with the selected user account 212, and generates at 424 transaction data 430 associated the identified transactions. For example, the identified transactions may include one or more transactions associated with a predetermined time period, such as a predetermined amount of time before the generation of the transaction data 430, a predetermined amount of time before the reported time of loss of theft, a predetermined amount of time before a time associated with the account selection data 410, and the like.

The account system 210 transmits at 432 the transaction data 430 to the system server 220. Upon receiving the transaction data 430, the system server 220 analyzes the transaction data 430 and, based on the transaction data 430, generates at 434 wallet data 440 corresponding to the transaction data 430. The system server 220 transmits at 442 the wallet data 440 to the client device 230 for providing an opportunity to manage the one or more transactions. For example, the wallet data 440 may be transmitted to provide an opportunity to manage one or more potentially fraudulent financial transactions.

Upon receiving the wallet data 440, the client device 230 uses the wallet data 440 to present information associated with one or more transactions, and prompts at 444 the user 214 to select, from the transactions, at least one transaction. For example, the user 214 may be prompted to verify at least one potentially fraudulent financial transaction as being a fraudulent financial transaction or as being a legitimate financial transaction. The information may be presented in any arrangement (e.g., list, array) based on one or more criteria including, for example, a transaction date, a transaction amount, a transaction type, a merchant name, and/or a merchant category. Additionally or alternatively, the information may be presented with a predetermined selection of zero or more transactions. Upon identifying a selection of a transaction, the client device 230 generates at 446 transaction selection data 450 associated with the selected transaction.

The client device 230 transmits at 452 the transaction selection data 450 to the system server 220. Upon receiving the transaction selection data 450, the system server 220 analyzes the transaction selection data 450 and, based on the transaction selection data 450, generates at 454 verification data 460 corresponding to the transaction selection data 450. The system server 220 transmits at 462 the verification data 460 to the account system 210 for managing the selected transaction. For example, the verification data 460 may be transmitted to update the cardholder account in accordance with the verified fraudulent financial transaction and/or the verified legitimate financial transaction.

Upon receiving the verification data 460, the account system 210 analyzes the verification data 460, and, based on the verification data 460, updates at 464 the user account 212 in accordance with the selected transaction. The account system 210 generates at 466 confirmation data 470 associated with the selected transaction, and transmits at 472 the confirmation data 470 to the system server 220 for documenting the notification associated with the user account 212 and/or the resolution associated with the transaction.

To ensure that the user account 212 is updated in accordance with the selected transaction, a request to provide confirmation data 470 may be transmitted to the account system 210 if the confirmation data 470 is not received within a predetermined amount of time. In some embodiments, the system server 220 determines whether a predetermined temporal threshold is satisfied, and, if the predetermined temporal threshold is not satisfied, transmits a request to provide confirmation data 470 to the account system 210. For example, the request may be transmitted every five minutes until the confirmation data 470 is received.

Figure 5:
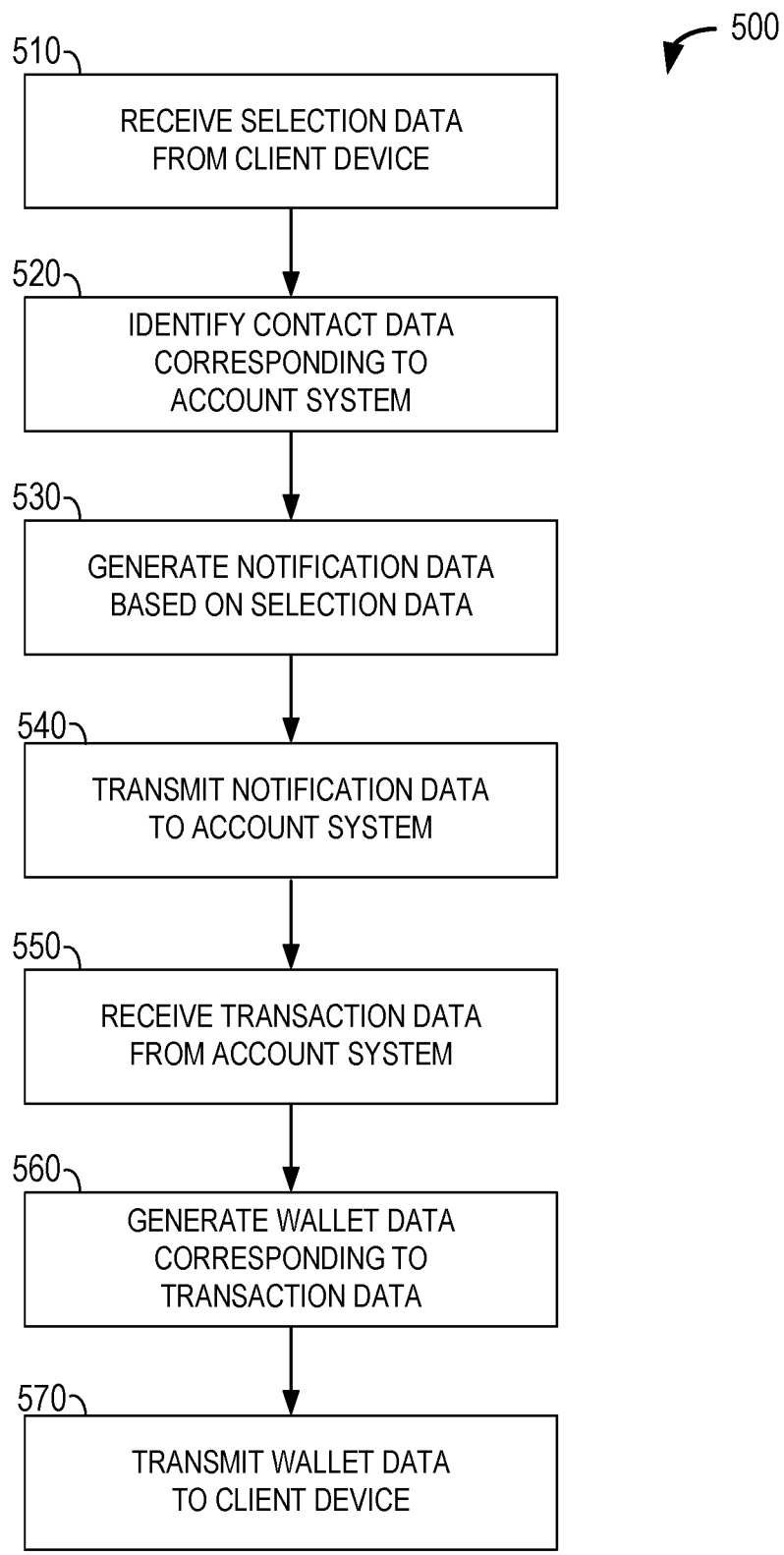
FIG. 5 is a flowchart of an example method for providing notification services using a digital wallet platform.

FIG. 5 is a flowchart of an example method 500 for providing notification services at the system server 220. In some embodiments, the system server 220 receives at 510 account selection data 410 associated with one or more user accounts 212 from a client device 230. In response to receiving the account selection data 410, contact data corresponding to one or more account systems 210 associated with the selected user accounts 212 is identified at 520. In some embodiments, the system server 220 determines whether a predetermined contact data threshold is satisfied. For example, if contact data associated with one or more account systems 210 is not stored or maintained at the system server 220, at least some contact data may be obtained from one or more other computing systems. In some embodiments, the system server 220 transmits, to the client device 230 and/or a directory system that stores or maintains contact data, a request to provide contact data corresponding to one or more account systems 210, and receives, from the client device 230 and/or the directory system, a response to the request including the contact data.

Notification data 420 associated with the selected user accounts 212 is generated at 530 and transmitted at 540 to the account systems 210. The notification data 420 may be generated to include or be associated with, for example, first notification data associated with a first cardholder account, and the first notification data may be transmitted to a first issuer system 240. In response to receiving the first notification data, a first issuer associated with the first cardholder account may use the first issuer system 240 to communicate with the client device 230 for freezing or closing the first cardholder account and/or opening another cardholder account. Additionally or alternatively, the notification data 420 may include bulletin notification data associated with one or more cardholder accounts.

In some embodiments, transaction data 430 associated with one or more transactions is received at 550 from a first account system 210 (e.g., the first issuer system 240). The transaction data 430 may be associated, for example, with one or more potentially fraudulent transactions. In response to receiving the transaction data 430, wallet data 440 corresponding to the transaction data is generated at 560 and transmitted at 570 to the client device 230 to provide an opportunity to manage the transactions.

Figure 6:
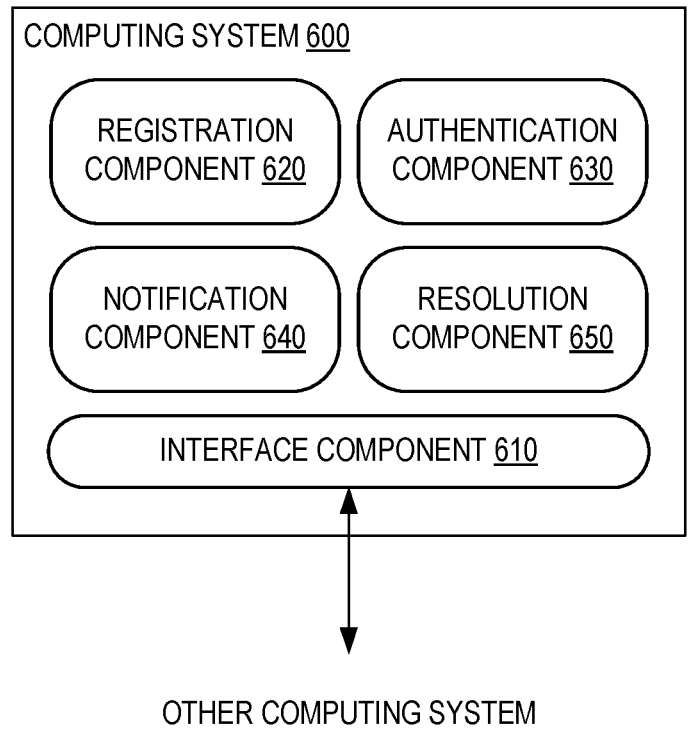
FIG. 6 is a block diagram illustrating a plurality of example components that may be used to provide notification services.

FIG. 6 is a block diagram illustrating a computing system 600 (e.g., a system server 220) that includes an interface component 610, a registration component 620, an authentication component 630, a notification component 640, and a resolution component 650 that may be used to provide notification services. The interface component 610 enables the computing system 600 to receive data from and/or transmit data to one or more other computing systems (e.g., account system 210, client device 230, first issuer system 240, second issuer system 250, first account system 340, second account system 360). For example, the interface component 610 may be coupled to the registration component 620, authentication component 630, notification component 640, and/or resolution component 650 to facilitate communication between another computing system and the registration component 620, authentication component 630, notification component 640, and/or resolution component 650. In some embodiments, the interface component 610 facilitates communication between the registration component 620, authentication component 630, notification component 640, and/or resolution component 650.

The registration component 620 enables the computing system 600 to manage data associated with one or more wallet accounts 222. For example, the registration component 620 may process a registration request to register data with the computing system 600 for enabling a user 214 to use a wallet account 222 associated with the registered data. In some embodiments, each wallet account 222 is associated with a respective user 214. The registration component 620 is configured to register data with the computing system 600 such that the interface component 610, registration component 620, authentication component 630, notification component 640, and/or resolution component 650 may access and/or use the data in an efficient manner.

The authentication component 630 enables the computing system 600 to authenticate one or more users 214. For example, the authentication component 630 may process credential data (e.g., user credential data 310) to determine whether a user 214 is associated with a wallet account 222 and/or with a user account 212. In some embodiments, the authentication component 630 generates authentication data 330 that indicates an authentication state associated with the user 214. The authentication data 330 may be used, for example, to support single sign-on authentication services with one or more account systems 210.

The notification component 640 enables the computing system 600 to manage one or more notifications associated with one or more wallet accounts 222. For example, the notification component 640 may process selection data (e.g., account selection data 410) to identify a plurality of entities (e.g., administrator 216), and systematically generate and transmit (e.g., via the interface component 610) notification data 420 to a plurality of account systems 210 associated with the entities such that a plurality of notifications may be substantially simultaneously communicated to the entities. In some embodiments, the notification data 420 generates the notification data 420 such that each entity receives a respective notification.

In some embodiments, the notification component 640 identifies contact data that may be used to transmit (e.g., via the interface component 610) the notification data 420 to one or more computing systems, such as an account system 210, a bulletin system, and/or a mobile payment system. For example, the notification component 640 may communicate (e.g., via the interface component 610) with the registration component 620 to identify and/or use contact data stored and maintained at the computing system 600. If at least some contact data is not stored or maintained at the computing system 600, in some embodiments, the notification component 640 identifies one or more other computing systems that may store and maintain the contact data, such as a directory system, and communicates (e.g., via the interface component 610) with the computing systems to identify and/or use the contact data.

The resolution component 650 enables the computing system 600 to validate data associated with one or more user accounts 212 and/or with one or more wallet accounts 222. For example, the resolution component 650 may facilitate communication between an account system 210 and a client device 230 to verify or confirm at least some account data. In this manner, at least some potentially fraudulent account data may be substantiated to ensure that at least some account data is current and accurate.

In some embodiments, the resolution component 650 processes account data associated with a user account 212 (e.g., transaction data 430) to generate wallet data 440 for presenting information associated with the account data to a user 214. For example, the resolution component 650 may enable information associated with one or more potentially fraudulent transactions to be presented to the user 214. The resolution component 650 may receive selection data (e.g., transaction selection data 450) associated with the account data, and generate verification data 460 corresponding to the selection data for transmission to an account system 210 associated with the user account 212. For example, the resolution component 650 may allow the user 214 to identify at least some potentially fraudulent transactions as a legitimate transaction or as a fraudulent transaction.

In some embodiments, the resolution component 650 prompts the account system 210 to provide confirmation data 470 associated with the account data. For example, the resolution component 650 may communicate (e.g., via interface component 610) with the account system 210 to ensure that there is mutual assent regarding a disposition of the account data. In some embodiment, the resolution component 650 determines whether a predetermined temporal threshold is satisfied (e.g., whether confirmation data 470 is received within a predetermined amount of time of an occurrence), and, if the predetermined temporal threshold is not satisfied, transmit (e.g., via the interface component 610) a request to provide confirmation data 470 to the account system 210.

Figure 7:
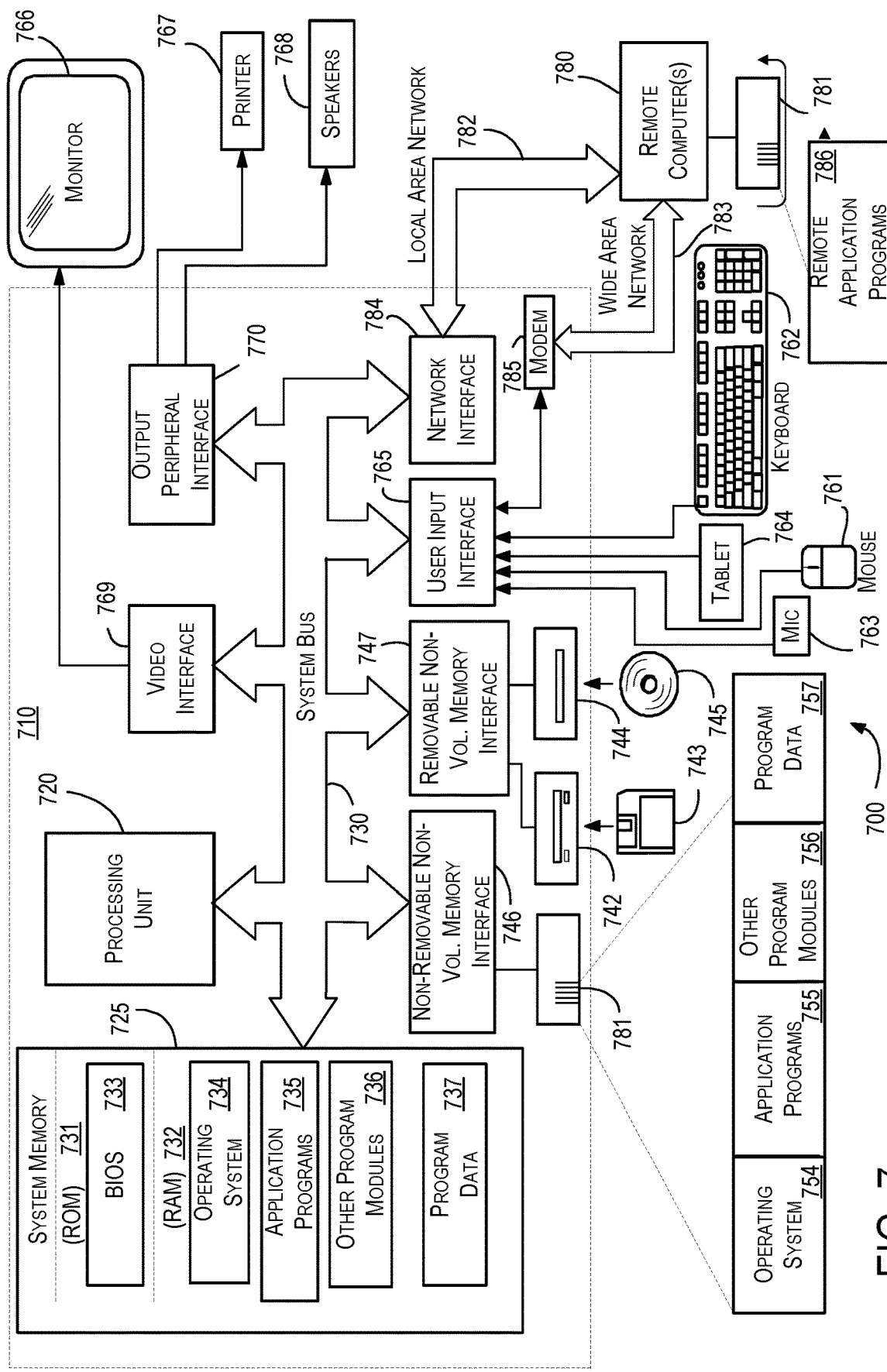
FIG. 7 is a block diagram illustrating an example operating environment for providing notification services.

FIG. 7 is a block diagram illustrating an example operating environment 700 that may be used to provide notification services. The operating environment 700 is only one example of a computing and networking environment and is not intended to suggest any limitation as to the scope of use or functionality of the disclosure. The operating environment 700 should not be interpreted as having any dependency or requirement relating to any one or combination of components illustrated in the example operating environment 700.

The disclosure is operational with numerous other computing and networking environments or configurations. While some examples of the disclosure are illustrated and described herein with reference to the operating environment 700 being or including a system server 220 (shown, e.g., in FIG. 2) and/or a computing system 600 (shown in FIG. 6), aspects of the disclosure are operable with any computing device (e.g., account system 210, client device 230, first issuer system 240, second issuer system 250, first account system 340, second account system 360) that executes instructions to implement the operations and functionality associated with the operating environment 700.

For example, the operating environment 700 may include a mobile device, a smart watch or device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable cardholder electronics, a network computer, a minicomputer, a mainframe computer, a distributed computing environment that include any of the above systems or devices, and the like. The operating environment 700 may represent a group of processing units or other computing devices. Additionally, any computing device described herein may be configured to perform any operation described herein including one or more operations described herein as being performed by another computing device.

With reference to FIG. 7, an example system for implementing various aspects of the disclosure may include a general purpose computing device in the form of a computer 710. Components of the computer 710 may include, but are not limited to, a processing unit 720 (e.g., a processor), a system memory 725 (e.g., a computer-readable storage device), and a system bus 730 that couples various system components including the system memory 725 to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 725 includes any quantity of media associated with or accessible by the processing unit 720. For example, the system memory 725 may include computer storage media in the form of volatile and/or nonvolatile memory, such as read only memory (ROM) 731 and random access memory (RAM) 732. The ROM 731 may store a basic input/output system 733 (BIOS) that facilitates transferring information between elements within computer 710, such as during start-up. The RAM 732 may contain data and/or program modules that are immediately accessible to and/or presently being operated on by processing unit 720. For example, the system memory 725 may store computer-executable instructions, application data, account data, credential data (e.g., user credential data 310, registered wallet credential data 320, registered account credential data 350, account credential data 370), authentication data 330, selection data (e.g., account selection data 410, transaction selection data 450), notification data 420, transaction data 430, wallet data 440, verification data 460, confirmation data 470, and other data.

The processing unit 720 may be programmed to execute the computer-executable instructions for implementing aspects of the disclosure, such as those illustrated in the figures (e.g., FIGS. 4 and 5). For example, the system memory 725 may include an interface component 610 (shown in FIG. 6), a registration component 620 (shown in FIG. 6), an authentication component 630 (shown in FIG. 6), a notification component 640 (shown in FIG. 6), and/or a resolution component 650 (shown in FIG. 6) for implementing aspects of the disclosure. The processing unit 720 includes any quantity of processing units, and the instructions may be performed by the processing unit 720 or by multiple processors within the operating environment 700 or performed by a processor external to the operating environment 700. By way of example, and not limitation, FIG. 7 illustrates operating system 734, application programs 735, other program modules 736, and program data 737.

Upon programming or execution of these components, the operating environment 700 and/or processing unit 720 is transformed into a special purpose microprocessor or machine. For example, the notification component 640, when executed by the processing unit 720, causes the computer 710 to receive account selection data 410 associated with one or more user accounts 212 (e.g., cardholder account), identify contact data corresponding to one or more account systems 210 associated with the user accounts 212 (e.g., issuer device), generate notification data 420 associated with the user accounts 212, and transmit the notification data 420 to the account systems 210 for notifying one or more administrators 216 associated with the user accounts 212 (e.g., issuer 140); and the resolution component 650, when executed by the processing unit 720, causes the computer 710 to receive transaction data 430 associated with one or more transactions (e.g., financial transactions), generate wallet data 440 corresponding to the transaction data 430, and transmit the wallet data 440 to a client device 230 for providing an opportunity to manage the transactions. Although the processing unit 720 is shown separate from the system memory 725, embodiments of the disclosure contemplate that the system memory 725 may be onboard the processing unit 720 such as in some embedded systems.

The computer 710 includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 731 and RAM 732 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 710. Computer storage media are implemented in hardware and exclude carrier waves and propagated signals. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user (e.g., user 214) may enter commands and information into the computer 710 through one or more input devices, such as a pointing device 761 (e.g., mouse, trackball, touch pad), a keyboard 762, a microphone 763, and/or an electronic digitizer 764 (e.g., tablet). Other input devices not shown in FIG. 7 may include a joystick, a game pad, a controller, a satellite dish, a camera, a scanner, an accelerometer, or the like. These and other input devices may be coupled to the processing unit 720 through a user input interface 765 that is coupled to the system bus 730, but may be connected by other interface and bus structures, such as a parallel port, game port or a universal serial bus (USB).

Information, such as text, images, audio, video, graphics, alerts, and the like, may be presented to a user via one or more presentation devices, such as a monitor 766, a printer 767, and/or a speaker 768. Other presentation devices not shown in FIG. 7 may include a projector, a vibrating component, or the like. These and other presentation devices may be coupled to the processing unit 720 through a video interface 769 (e.g., for a monitor 766 or a projector) and/or an output peripheral interface 770 (e.g., for a printer 767, a speaker 768, and/or a vibration component) that are coupled to the system bus 730, but may be connected by other interface and bus structures, such as a parallel port, game port or a USB. In some embodiments, the presentation device is integrated with an input device configured to receive information from the user (e.g., a capacitive touch-screen panel, a controller including a vibrating component). Note that the monitor 766 and/or touch screen panel may be physically coupled to a housing in which the computer 710 is incorporated, such as in a tablet-type personal computer.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 782 and one or more wide area networks (WAN) 783, but may also include other networks. Such networking environments are commonplace in offices, enterprise-wide computer networks, intranets and the Internet.

When used in a LAN networking environment, the computer 710 is coupled to the LAN 782 through a network interface or adapter 784. When used in a WAN networking environment, the computer 710 may include a modem 785 or other means for establishing communications over the WAN 783, such as the Internet. The modem 785, which may be internal or external, may be connected to the system bus 730 via the user input interface 765 or other appropriate mechanism. A wireless networking component including an interface and antenna may be coupled through a device, such as an access point or peer computer to a LAN 782 or WAN 783. In a networked environment, program modules depicted relative to the computer 710, or portions thereof, may be stored in the remote memory storage device. By way of example, and not limitation, FIG. 7 illustrates remote application programs 786 as residing on memory storage device 781. It may be appreciated that the network connections shown are examples and other means of establishing a communications link between the computers may be used.

The block diagram of FIG. 7 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 7 may be performed by other elements in FIG. 7, or an entity (e.g., processor, web service, server, applications, computing device, etc.) not shown in FIG. 7.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable cardholder electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for providing authentication services. For example, the elements illustrated in FIGS. 1-4, 6, and 7, such as when encoded to perform the operations illustrated in FIGS. 4 and 5, constitute at least an example means for generating wallet data 440 associated with one or more user accounts 212 (e.g., notification component 640); an example means for transmitting wallet data 440 to provide an opportunity to manage one or more user accounts 212 (e.g., interface component 610, resolution component 650); an example means for receiving account selection data 410 associated with one or more user accounts 212 (e.g., interface component 610, notification component 640); an example means for identifying contact data corresponding to one or more account systems 210 (e.g., notification component 640); an example means for generating notification data 420 associated with one or more user accounts 212 (e.g., notification component 640); an example means for transmitting notification data 420 associated with one or more user accounts 212 (e.g., interface component 610, notification component 640); an example means for receiving transaction data 430 associated with one or more transactions (e.g., interface component 610, resolution component 650); an example means for generating wallet data 440 associated with one or more transactions (e.g., interface component 610, resolution component 650); and/or an example means for transmitting wallet data 440 to provide an opportunity to manage one or more transactions (e.g., interface component 610, resolution component 650).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computing system for providing notification services, the computing system comprising:

a memory device storing data associated with one or more digital wallets and computer-executable instructions, the one or more digital wallets being associated with cardholder accounts that are potentially compromised; and a processor configured to execute the computer-executable instructions to:

receive, from a client device, user credential data associated with a user of a first digital wallet of the one or more digital wallets;

compare the received user credential data with registered wallet credential data associated with the first digital wallet to generate authentication data for transmitting to a first issuer device in a first zone associated with a first set of permission levels and to generate registered account credential data for transmitting to a second issuer device in a second zone associated with a second set of permission levels, the first set of permission levels being different than the second set of permission levels, the first issuer device and the second issuer device determining that the user is an authorized user using the authentication data and the registered account credential data respectively;

present, via an application executing on the client device, information associated with a plurality of cardholder accounts;

receive, via an application programming interface (API) from the application executing on the client device, account selection data associated with the plurality of cardholder accounts;

using the received account selection data, identify contact data corresponding to issuer devices associated with the plurality of cardholder accounts, the issuer devices including the first issuer device and the second issuer device;

generate notification data tailored to the plurality of cardholder accounts, the generated notification data including an indication that the plurality of the cardholder accounts is potentially compromised;

using the identified contact data, transmit the generated notification data to each of the issuer devices;

receive, by a system server from at least one of the issuer devices, transaction data associated with one or more financial transactions, the one or more financial transactions being associated with a first cardholder account of the plurality of cardholder accounts and being selected based on the notification data;

analyze the received transaction data to generate wallet data including information associated with the one or more financial transactions; and transmit the generated wallet data to the client device to enable a cardholder of the first cardholder account to verify, based on the generated wallet data, from the application executing on the client device whether any of the one or more financial transactions is fraudulent.

2. The computing system of claim 1, wherein based on a verification that at least one financial transaction of the one or more financial transactions of the first cardholder account is fraudulent, the first cardholder account is closed.

3. The computing system of claim 1, wherein the wallet data includes one or more of: a transaction date, a transaction amount, a transaction type, and a merchant name associated with the one or more financial transactions.

4. The computing system of claim 1, wherein transmitting the generated notification data to each of the issuer devices comprises transmitting the generated notification data to the first issuer device in the first zone according to the first set of permission levels that facilitates increased communication with the system server and transmitting the generated notification data to the second issuer device in the second zone according to the second set of permission levels that are less permissive for communication with the system server.

5. The computing system of claim 1, wherein the processor is further configured to execute the computer-executable instructions to:

generate the notification data to include first notification data associated with the first cardholder account; and transmit, to the at least one of the issuer devices in a secure session, the first notification data for notifying that the first cardholder account is compromised.

6. The computing system of claim 1, wherein the processor is further configured to execute the computer-executable instructions to:

generate the notification data to include bulletin notification data associated with the plurality of cardholder accounts; and transmit, to a bulletin system, the bulletin notification data for notifying a plurality of merchants associated with the bulletin system that at least one account of the plurality of cardholder accounts is potentially compromised, wherein the plurality of merchants is configured to take action to prevent misuse of the potentially compromised cardholder accounts.

7. The computing system of claim 1, wherein the processor is further configured to execute the computer-executable instructions to:

receive, from the client device, transaction selection data associated with a first financial transaction of the one or more financial transactions, the one or more financial transactions being associated with a predetermined time period;

analyze the received transaction selection data to generate verification data corresponding to the transaction selection data; and transmit, to the first issuer device, the generated verification data for managing the first financial transaction.

8. The computing system of claim 7, wherein the processor is further configured to execute the computer-executable instructions to:

determine whether a predetermined temporal threshold associated with the verification data is satisfied; and on condition that the predetermined temporal threshold is not satisfied, transmit, to the first issuer device, a request to provide confirmation data associated with the first financial transaction.

9. One or more computer storage media embodied with computer-executable instructions, the one or more computer storage media comprising:

a notification component that, upon execution by at least one processor, causes a computing system to receive, from a client device, user credential data associated with a user of a first digital wallet of the one or more digital wallets, compare the received user credential data with registered wallet credential data associated with the first digital wallet to generate authentication data for transmitting to a first issuer device in a first zone associated with a first set of permission levels and to generate registered account credential data for transmitting to a second issuer device in a second zone associated with a second set of permission levels, the first set of permission levels being different than the second set of permission levels, the first issuer device and the second issuer device determining that the user is an authorized user using the authentication data and the registered account credential data respectively, present, via an application executing on the client device, information associated with a plurality of cardholder accounts, receive, via an application programming interface (API) from the application executing on the client device, account selection data associated with the plurality of cardholder accounts, using the received account selection data, identify contact data corresponding to a plurality of issuer devices associated with the plurality of cardholder accounts, the plurality of issuer devices including the first issuer device and the second issuer device, generate notification data tailored to the plurality of cardholder accounts, the generated notification data including an indication that the plurality of the cardholder accounts is potentially compromised, and using the identified contact data, transmit the generated notification data to each of the issuer devices; and a resolution component that, upon execution by the at least one processor, causes the computing system to receive, from at least one of the issuer devices, transaction data associated with one or more financial transactions, the one or more financial transactions being associated with a first cardholder account of the plurality of cardholder accounts and being selected based on the notification data, analyze the received transaction data to generate wallet data including information associated with the one or more financial transactions, and transmit the generated wallet data to the client device to enable a cardholder of the first cardholder account to verify, based on the generated wallet data, from the application executing on the client device whether any of the one or more financial transactions is fraudulent.

10. The one or more computer storage media of claim 9, wherein based on a verification that at least one financial transaction of the one or more financial transactions of the first cardholder account is fraudulent, closing the first cardholder account.

11. The one or more computer storage media of claim 9, wherein the notification component is configured to identify that a predetermined contact data threshold is not satisfied, and the plurality of issuer devices is notified that the first cardholder account of the plurality of cardholder accounts is compromised based on the identification that the predetermined contact data threshold is not satisfied.

12. The one or more computer storage media of claim 9, wherein the notification component is configured to generate bulletin notification data associated with the plurality of cardholder accounts, and transmit the bulletin notification data to a bulletin system for notifying a plurality of merchants associated with the bulletin system that at least one account of the plurality of cardholder accounts is potentially compromised, wherein the plurality of merchants is configured to take action to prevent misuse of the potentially compromised cardholder accounts.

13. The one or more computer storage media of claim 9, wherein the resolution component is configured to receive transaction selection data associated with a first financial transaction of the one or more financial transactions, generate verification data corresponding to the transaction selection data, and transmit the verification data to the first issuer device of the plurality of issuer devices for managing the first financial transaction.

14. The one or more computer storage media of claim 13, wherein the resolution component is configured to determine whether a predetermined threshold associated with the verification data is satisfied, and, on condition that the predetermined threshold is not satisfied, transmit a request to provide confirmation data associated with the first financial transaction to the first issuer device.

15. A computer-implemented method for providing notification services using a digital wallet platform, the computer-implemented method comprising:
 receiving, from a client device, user credential data associated with a user of a first digital wallet of the one or more digital wallets;
 comparing the received user credential data with registered wallet credential data associated with the first digital wallet to generate authentication data for transmitting to a first issuer device in a first zone associated with a first set of permission levels and to generate registered account credential data for transmitting to a second issuer device in a second zone associated with a second set of permission levels, the first set of permission levels being different than the second set of permission levels, the first issuer device and the second issuer device determining that the user is an authorized user using the authentication data and the registered account credential data respectively;
 presenting, via an application executing on the client device, information associated with a plurality of user accounts;
 receiving, via an application programming interface (API) from the application executing on the client device, account selection data associated with the plurality of user accounts;
 using the received account selection data, identifying contact data corresponding to issuer devices associated with the plurality of user accounts, the issuer devices including the first issuer device and the second issuer device;
 generating notification data tailored to the plurality of user accounts, the generated notification data including an indication that the plurality of the user accounts is potentially compromised;
 using the identified contact data, transmitting, to each of the issuer devices, the generated notification data;
 receiving, by a system server from at least one of the issuer devices, transaction data associated with one or more transactions, the one or more transactions being associated with a first user account of the plurality of user accounts and being selected based on the notification data;
 analyzing the received transaction data to generate wallet data including information associated with the one or more financial transactions; and
 transmitting the generated wallet data to the client device to enable a user of the first user account to verify, based on the generated wallet data, from the application executing on the client device whether any of the one or more financial transactions is fraudulent.

16. The computer-implemented method of claim 15, wherein based on a verification that at least one financial transaction of the one or more financial transactions of the first user account is fraudulent, closing the first user account.

17. The computer-implemented method of claim 15, wherein the wallet data includes one or more of: a transaction date, a transaction amount, a transaction type, and a merchant name associated with the one or more financial transactions.

18. The computer-implemented method of claim 15, wherein transmitting the generated notification data to each of the issuer devices comprises transmitting the generated notification data to the first issuer device in the first zone according to the first set of permission levels that facilitates increased communication with the system server and transmitting the generated notification data to the second issuer device in the second zone according to the second set of permission levels that are less permissive for communication with the system server.

19. The computer-implemented method of claim 15, further comprising:
 generating the notification data to include first notification data associated with the first user account, and bulletin notification data associated with the plurality of user accounts:
 notifying a first administrator of one or more administrators that the first user account is compromised; and
 transmitting, to a bulletin system, the bulletin notification data to notify a plurality of merchants associated with the bulletin system that the first user account is compromised, wherein the plurality of merchants is configured to take action to prevent misuse of the first user account.

20. The computer-implemented method of claim 15, further comprising:
 receiving, from the client device, transaction selection data associated with a first transaction of the one or more transactions;
 based on the received transaction selection data, generating verification data corresponding to the transaction selection data; and
 transmitting, to the first issuer device, the generated verification data to manage the first transaction.

* * * * *